United States Patent [19]
Frohbach

[11] 3,849,698
[45] Nov. 19, 1974

[54] ELECTROMECHANICAL SWEEP GENERATING SYSTEM WITH THE UTILIZATION OF PHOTOCELLS

[75] Inventor: Hugh F. Frohbach, Sunnyvale, Calif.
[73] Assignee: Stanford Research Institute, Menlo Park, Calif.
[22] Filed: Apr. 25, 1973
[21] Appl. No.: 354,237

[52] U.S. Cl....315/367, 250/231 SE, 340/347 AD
[51] Int. Cl. ............................................ H01j 29/70
[58] Field of Search..................... 315/19, 18, 25 R; 250/231 SE, 203 R, 203 CT, 232

[56] References Cited
UNITED STATES PATENTS
| | | | |
|---|---|---|---|
| 3,410,976 | 11/1968 | Watson | 250/231 SE |
| 3,654,479 | 4/1972 | Catherin | 250/231 SE |
| 3,749,925 | 7/1973 | Hertrich | 250/231 SE |

Primary Examiner—Maynard R. Wilbur
Assistant Examiner—J. M. Potenza
Attorney, Agent, or Firm—Urban H. Faubion

[57] ABSTRACT

An electrical waveform is generated which is sinusoidal relative to the angular position of a shaft which rotates in a single direction by means of an optically sensed, or scanned, patterned disk affixed to the shaft to rotate in synchronism with it. The pattern on the disk primarily comprises uniformly spaced parallel lines on its face. In addition, a half revolution sensor such as a peripheral band having halves of differing optical properties is used. A first photocell scans the lines on the disk as it is rotated to count the number of lines and a second photocell scans the half revolution indicator, e.g., the peripheral band (outside track) of the disk. The first photocell produces a series of pulses indicative of the number of lines scanned and the second photocell produces an output which indicates when all of the lines on the face have been counted once and provides interlace between alternate counts. The number of lines scanned is added until they have all been counted once to produce the increasing half of the sinusoidal wave and then they are subtracted until they have all been counted a second time to produce the decreasing half of the sinusoidal wave. The sequence is repeated continuously to provide the desired waveform which is used as the vertical deflection voltage for a display device. Each line counted is also used to generate a horizontal sweep voltage for the display device so that in spite of the sinusoidal character of the vertical deflection, the lines composing the raster of the display are evenly and uniformly spaced.

14 Claims, 4 Drawing Figures

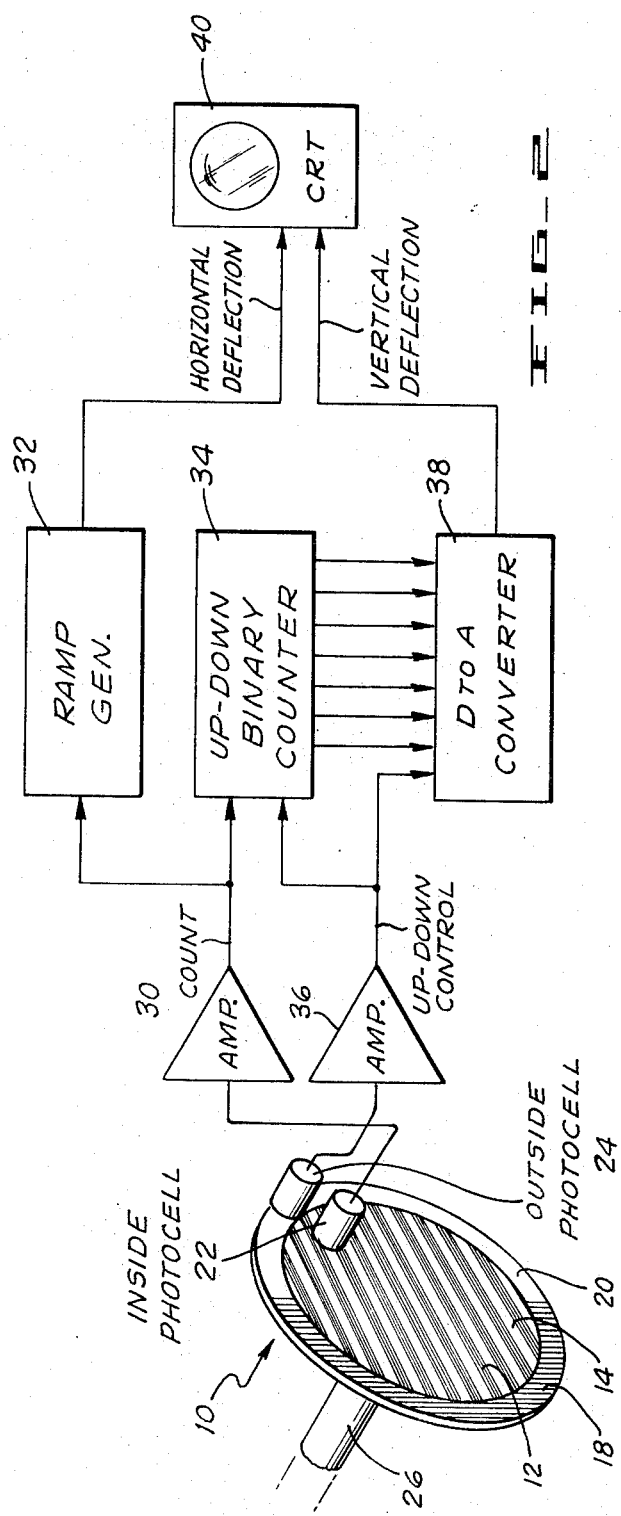
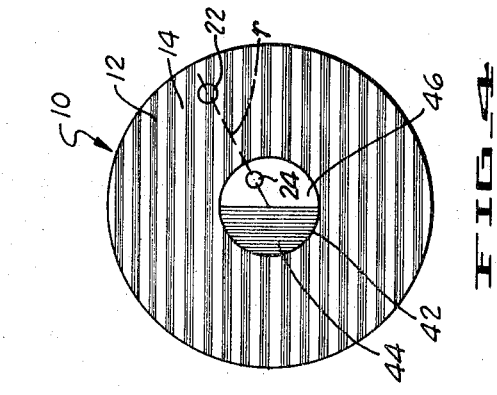
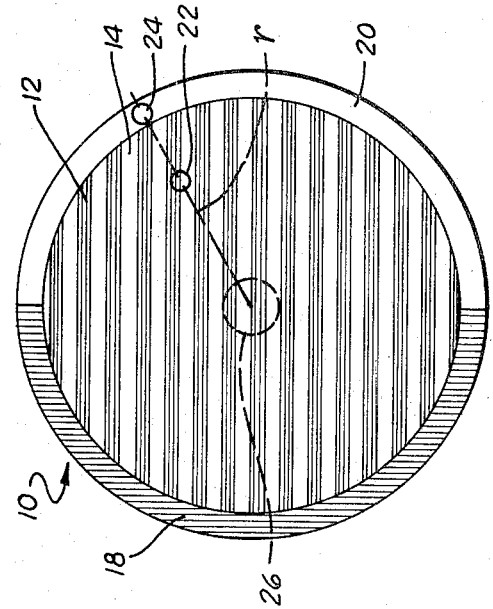
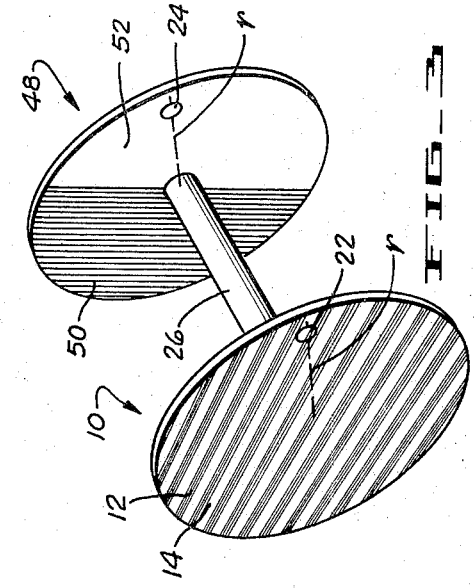

ELECTROMECHANICAL SWEEP GENERATING SYSTEM WITH THE UTILIZATION OF PHOTOCELLS

ORIGIN OF INVENTION

The invention described herein was made in the course of work under a grant or award from the Department of Health, Education and Welfare.

BACKGROUND OF INVENTION

This invention relates to sweep generators, and more particularly, to improvements therein.

A problem arose when it was desired to generate deflection voltages for a cathode ray tube in synchronism with the angular positions assumed by a rotating device. Specifically, the problem arose in connection with the visual presentation of a compressional wavefield in acoustic imaging. Obviously, the system has far broader application, but in view of the direct practical application, the present description assumes this use.

In the contemplated use, the compressional wavefield is incident upon a linear array of piezoelectric transducers which converts a line across the compressional wavefield to electrical waveforms (signals) that are to be converted to a visual image, as on the face of a cathode ray tube. In order to produce a visual representation of the entire compressional wavefield, the wavefield is swept back and forth past the linear array of transducers by a pair of counterrotating prisms interposed between the compressional wavefield and the array of transducers. The position of the wavefield is proportional to the sine of the angle through which the prisms have been rotated.

One problem then is to produce a vertical sweep voltage for the visual display tube in absolute synchronism with the sinusoidal movement of the compressional image field past the transducer array. Since the field position is determined by the counterrotating prisms, this problem reduces to one of generating the vertical deflection voltage for the display tube in perfect synchronism with the angular positions assumed by the rotating prisms.

A separate portion of the total wavefield is presented for each horizontal line of the image. Thus, each separate portion of the wavefield (line across the wavefield) may be considered a successive wavefield. In order for these image lines to represent evenly spaced positions, it is necessary to cause the generation of the wavefields (and their impact on the linear receiving transducers) to occur at certain specified times during the sinusoidal deflection. Thus, a second problem is to generate the successive wavefields at instants when they will be evenly displaced in position at the linear transducer array.

Neither the linear array of piezoelectric transducers nor the counterrotating prisms are illustrated or described in detail here since they do not constitute part of this invention. Both inventions are found in copending patent applications by Philip S. Green which are assigned to the assignee of the present invention. The transducer is described and claimed in "Linear Transducer Array for Ultrasonic Image Conversion," Ser. No. 291,002, filed Sept. 21, 1972, and the prism system is found in "Focusing and Deflecting System for Acoustic Imaging," Stanford Research Institute Docket Number P-873. The subject matter of these two applications is incorporated herein by reference.

OBJECTS AND SUMMARY OF INVENTION

An object of this invention is to provide a novel and useful electromechanical system for generating timing signals in synchronism with a rotating shaft.

Yet another object of this invention is the provision of a simple system for generating electrical signals suitable for display tube deflection in synchronism with the rotation of the shaft.

These and other objects of the invention are achieved by rotatably supporting a disk which is coupled to rotate in synchronism with whatever device is being rotated. The disk has a plurality of alternate parallel black and white stripes drawn over the surface thereof. Also the disk, shaft or another disk is provided with means for discerning half revolutions. For example, in one embodiment for half of the circumference of the periphery of the disk there is a black stripe and for the other half a white stripe. In another arrangement a spot or circular area at the center of the disk, possibly even the end of the disk supporting shaft, may have half its area (divided by a diameter) of one color and the other half another. Still another arrangement makes use of a separate disk mounted for synchronous rotation with the first and colored half-and-half as described with respect to the center spot previously described. It should be appreciated that the colors "black" and "white" are exemplary only. Two other colors or any arrangement of opaque and transparent areas may be used. For example, an opaque disk with slots and solid areas may be used. Any such arrangement is within the contemplation of "different color" or "black and white." A first photocell is placed at a distance r from the center of the disk so that it can detect the light changes from the parallel lines as the disk rotates. A second photocell is placed over the periphery of the disk which has the black and white stripes thereon so that it can detect signals therefrom.

The signals from the first photocell are used to drive an up-down binary counter, in an up count mode when the second photocell indicates an output from the white peripheral track, for example, and in a down count mode when the second photocell output indicates it is over the black track. A digital-to-analog (D/A) converter converts the count of the counter into an analog signal which can be used for vertical deflection of the beam of a cathode ray tube. Each count signal applied to the binary counter can be used to generate a ramp voltage from a ramp generator which can be used for horizontal deflection in a cathode ray tube. Interlace of the horizontal signals during up and down count is achieved by using the output of the second photocell as the least significant bit to the D/A converter.

BRIEF DESCRIPTION OF DRAWINGS

FIG. 1 is an illustration of a disk and the placement of photocells thereover in accordance with this invention;

FIG. 2 is a block schematic diagram in partial perspective illustrating the circuitry which may be employed in accordance with this invention;

FIG. 3 is an illustration of another disk similar to that used in the embodiments of FIGS. 1 and 2 which may be used in place thereof; and FIG. 4 is a perspective view showing a pair of disks that perform the same function in essentially the same way as the disk illustrated in and described with reference to FIGS. 1 and 2.

DESCRIPTION OF PREFERRED EMBODIMENTS

FIG. 1 represents a timing disk in accordance with this invention. The timing disk 10 has a plurality of uniformly spaced, parallel and alternate lines 12 of one color (opaque) and lines 14 of a second color (transparent). Any colors suitable for photocell detection will do; black and white (clear) are used by way of illustration. Half of the periphery of the disk is covered by a stripe 18 of one color (black or opaque) and the other half by a stripe 20 of a second color (white, clear or transparent). These constitute an outer track.

A first photocell 22 is placed at a distance $r$ from the center of the disk which distance need only be sufficient to ensure that each line is distinguishable. A second photocell 24 is placed over the outer track on the periphery of the disk. The output of the first photocell 22 will be a frequency modulated square wave, as the disk rotates. The magnitude of the distance $r$ from the center together with the line spacing determines the total number of square wave cycles per revolution of the disk. This number increases linearly with an increase in radius.

Referring now to FIG. 2, there may be seen a block schematic diagram of a decoder which is used with the disk 10. As previously indicated, the disk is coupled to a shaft 26, which is driven synchronously with whatever apparatus is being rotated so that the disk is also rotated therewith. The photocell 22, here designated as the inside photocell, has its output amplified by an amplifier 30. The output, which comprises pulses of one polarity, is applied to an up-down counter 34 and also to a ramp generator 32.

The output of the photocell 24, here designated as the outside photocell, is applied to an amplifier 36. The output of the outside photocell comprises a pulse having a duration determined by the time required for half of the outside track to rotate past the outside photocell 24. The output of the amplifier 36 is applied to the up-down counter 34 to cause it to count up when the photocell 24 reads from one half of the peripheral track (for example, the white half 20) and to count down when the photocell 24 is over the other half of the peripheral track.

The up-down binary counter counts in response to the pulses from the inside photocell, and counts up and then down under the control of the signal received from the outside photocell. A D/A converter 38 converts the count of the up-down binary counter into an analog voltage. The least significant bit of the D/A converter is supplied by the output of the amplifier 36. Thus, when the outside photocell 24 is over, for example, the white half of the outside track, there will be a one bit in the least significant bit position, and when it is over the dark half of the outside track, there will be a zero bit in the least significant bit position.

Each pulse output from the inside photocell, which activates the up-down binary counter, also causes the ramp generator 32 to generate a ramp voltage. The output of the D/A converter 38 is applied to a display device, such as cathode ray tube (CRT) 40, as the vertical deflection voltage. The output of the ramp generator 36 is applied to the CRT 40 as the horizontal deflection voltage. The use of the output of the outside photocell to provide the least significant bit for the D/A converter causes the horizontal deflection voltages to be interlaced; that is, the horizontal deflection voltages which occur when the binary counter 34 is counting up are interlaced with the horizontal deflection voltages which occur when the binary counter is counting down.

The position of the ruled line grating on the disk face with respect to the center of rotation of the disk should be adjusted so that the center is either midway between lines or exactly in the center of a line. This will ensure that it is possible for a photocell to fit completely within a line region at the two extreme positions of the disk. Otherwise there may be an ambiguity if at one of the extremes the photocell is only partially excited by a line. In any case, the radial position of the photocell 22 should be adjusted so that it lies entirely within the line at the extreme position. With the system described, the face of the CRT will describe $2nr$ parallel, equally spaced traces (where $n =$ number of lines per unit distance on the code wheel 10 and $r =$ radial distance of the photocell 22 from the center). Half of these traces are generated as the binary counter is counting up and the other half, interlaced with the first half, are generated as the counter is counting down.

For the particular application contemplated here, the disk is rotated at 450 revolutions per minute, there are 100 lines on the face of the disk, and the inside photocell 22 is one inch from the center. Thus, the CRT 40 has $2 \times 100 \times 1 = 200$ parallel interlaced lines on its face, which give good resolution of the region imaged thereon.

While the particular code disk 10 described with respect to FIGS. 1 and 2 is simple and easy to use, a number of other arrangements can be utilized that will do the job equally well. FIGS. 3 and 4 show such arrangements. Since the code disks of all the figures have common elements which perform the same functions in the same way, the corresponding elements in the figures are given the same reference numerals. Only the features of the devices which differ are given different reference numerals.

The code disk 10 of FIG. 3 differs from the ones of FIGS. 1 and 2 in that the half revolution indicator in the embodiment of FIG. 3 constitutes a circular area 42 in the center of the disk rather than the outer track (dark and light bands 18 and 20, respectively) as in the embodiments of FIGS. 1 and 2. The dark and light areas which provide means for indicating half revolutions in the central circular area 42 are defined by dividing the circle in halves (by a diameter) and making half the circular area dark or opaque (44) and the other half (46) white or clear. For such an arrangement, then, the photocell 24 which senses the half revolutions of the disk is positioned adjacent the inner circular area 42.

The arrangement in FIG. 4 uses, in addition to the code disk 10 with its dark and light stripes 12 and 14, respectively, a second half revolution indicating disk 48 mounted on the shaft 26 so that it rotates with the code disk 10. Like the center half revolution indicating area 42 of the disk 10 shown in FIG. 3, the half revolution indicating disk 48 is divided in half (by a diameter) and the opposite halves are dark or opaque (left side 50 in the figure) and light or clear (right side 52 in the figure). The half revolution indicating photocell 24 is positioned adjacent the half revolution indicating disk 48 so that the photocell produces an output which indicates each time all of the lines on the face of the code disk 10 have been counted once.

There has been accordingly described and shown herein a novel, useful and simple system for generating scanning signals in synchronism with a rotating device. While particular embodiments of the invention have been shown, it will, of course, be understood that the invention is not limited thereto since many modifications may be made both in the circuit arrangement and the instrumentalities employed. It is contemplated that the appended claims will cover any such modifications as fall within the true spirit and scope of the invention.

What is claimed is:

1. Apparatus for generating synchronizing signals in synchronism with a rotating device comprising:
   disk means;
   means for rotatably supporting said disk means to be driven in synchronism with said rotating device;
   said disk means having parallel, equally spaced lines of one color alternate with parallel, equally spaced lines of a second color covering a face thereof and having a marking of one color extending over half of the perimeter of said face and a marking of another color extending over the other half of the perimeter of said face;
   a first photodetector means adjacent to said disk means and spaced at a predetermined radial distance from the center thereof for generating first signals responsive to the lines of said disk means;
   a second photodetector means adjacent said disk means positioned for generating second signals responsive to one of the colors on the perimeter of said disk means;
   first means responsive to said first signals for generating ramp signals synchronous with each first signal; and
   second means responsive to said first and second signals for generating an analog voltage which increases in the presence of second signals and decreases in the absence of second signals.

2. Apparatus as recited in claim 1 wherein said first means responsive to said first signals for generating ramp signals comprises ramp generator means to which said first signals are applied for generating ramp signals responsive thereto.

3. Apparatus as recited in claim 1 wherein said second means responsive to said first and second signals for generating an analog voltage comprises:
   up-down counter means;
   means for applying the output of said second photocell means to said up-down counter means to enable it to count up in response to second signals and down in the absence of second signals;
   means for applying first signals to said up-down counter means to be counted;
   digital-to-analog counter means for converting the output of said up-down counter means to an analog voltage; and
   means for applying said second signals to said digital-to-analog voltage means as a least significant bit.

4. A system as recited in claim 1 wherein there is included a cathode ray tube means;
   means to apply said ramp signals to said cathode ray tube means as horizontal deflection voltages; and means to apply said analog signal to said cathode ray tube means as a vertical deflection voltage.

5. Apparatus for generating synchronizing signals in synchronism with a rotating device comprising disk means;
   means for rotatably supporting said disk means to be driven synchronously with said rotating device;
   said disk means having parallel, equally spaced lines of one color alternate with parallel equally spaced lines of a second color covering a face thereof and having a marking of one color extending over half of the perimeter of said face and a marking of another color extending over the other half of the perimeter of said face;
   a first photodetector means adjacent to said disk means and spaced at a predetermined radial distance from the center thereof for generating first signals responsive to the lines on said disk means;
   a second photodetector means adjacent said disk means positioned for generating second signals responsive to one of the colors on the perimeter of said disk means;
   up-down counter means;
   means for applying the output of said first photocell to said up-down counter means to cause it to count in response thereto;
   means for applying the output of the second photocell to said up-down counter means to cause it to count up when said second photodetector means is viewing one color on the perimeter of said disk and to count down when said second photodetector means is viewing said another color on the perimeter of said disk;
   means for converting the output of said up-down counter means to an analog voltage synchronous with the angular position of said rotating device; and
   means for generating ramp voltage responsive to each output of said first photocell which causes said up-down counter means to count in a manner synchronous with each line of said one color detected by said first photocell.

6. A system as recited in claim 5 wherein said means for converting the count of said up-down counter means to an analog voltage comprises a digital-to-analog converter to which the count of said up-down counter means is applied; and
   means for applying the output of said second photocell to said digital-to-analog converter as a least significant bit.

7. A system as recited in claim 5 wherein there is included a cathode ray tube means;
   means to apply said ramp signals to said cathode ray tube means as horizontal deflection voltages; and means to apply said analog signal to said cathode ray tube means as a vertical deflection voltage.

8. An apparatus for generating electrical waveforms in synchronism with the movements of a device which follows a regular, repetitive motion said apparatus comprising disk means;

means for rotatably supporting said disk means in synchronism with the regular, repetitive motion of said device; and said disk means having parallel, equally spaced lines of one color alternate with parallel, equally spaced lines of a second color covering a face thereof and having a marking of one color extending over half of the perimeter of said face and a marking of another color extending over the other half of the perimeter of said face.

9. Apparatus as recited in claim 8 wherein there is provided a decoding means, said decoding means including scanning means for scanning the said equally spaced lines provided on said disk means and generating an electrical waveform in response to the number of lines counted, and means to cause said electrical waveform to increase as one half of the said equally spaced lines on said disk means is counted and decrease when the other half of said equally spaced lines is counted, whereby the said electrical waveform is substantially sinusoidal with respect to the angular position of said rotatable disk means.

10. Apparatus for generating synchronizing signals in synchronism with a rotating device comprising disk means;

means for rotatably supporting said disk means to be driven in synchronism with said rotating device;

said disk means having parallel, equally spaced lines of one color alternate with parallel, equally spaced lines of a second color covering a face thereof;

photodetector means adjacent to said disk means and spaced at a predetermined radial distance from the center thereof for generating first signals responsive to the lines of said disk means;

second signal generating means for generating second signals responsive to half revolutions of said disk means;

first means responsive to said first signals for generating ramp signals synchronous with each first signal; and second means responsive to said first and second signals for generating an analog voltage which increases in the presence of second signals and decreases in the absence of second signals.

11. Apparatus as recited in claim 10 wherein said first means responsive to said first signals for generating ramp signals comprises ramp generator means to which said first signals are applied for generating ramp signals responsive thereto.

12. Apparatus as recited in claim 10 wherein said second means responsive to said first and second signals for generating an analog voltage comprises:

up-down counter means;

means for applying the output of said second signal generating means to said up-down counter means to enable it to count up in response to second signals and down in the absence of second signals;

means for applying first signals to said up-down counter means to be counted;

digital-to-analog counter means for converting the output of said up-down counter means to an analog voltage; and means for applying said second signals to said digital-to-analog voltage means as a least significant bit.

13. Apparatus as recited in claim 10 wherein said disk means also has a centrally located circular area divided in two halves by a diameter with one half being of one color and the other half of another color and said second signal generating means includes a second photodetector means positioned to be responsive to one of the colors on the said centrally located circular area.

14. Apparatus as recited in claim 10 wherein said second signal generating means includes a second disk means mounted to rotate with said first disk means and being divided in two halves by a diameter with one half being of one color and the other half of another color and also including a second photodetector means positioned to be responsive to one of the colors on the said second disk.

* * * * *